Patented Jan. 12, 1943

2,307,937

UNITED STATES PATENT OFFICE 2,307,937

REMOVAL OF FORMALDEHYDE FROM MIXTURES CONTAINING THE SAME

Carl S. Marvel, Urbana, Ill., assignor to E. I. du Pont de Nemours & Company, Wilmington, Del., a corporation of Delaware No Drawing. Application May 18, 1939, Serial No. 274,403

1 Claim. (Cl. 260—615)

This invention relates to the removal of formaldehyde from mixtures containing it as such or in the form of compounds capable of liberating formaldehyde.

It is known that formaldehyde, because of its peculiar properties, is difficult to remove from mixtures in which it is present by any simple means such as distillation or extraction. It is also well known that the presence of formaldehyde in a mixture which is to be subsequently hydrogenated is undesirable since it acts as a hydrogenation catalyst poison and therefore makes it necessary to use large amounts of catalysts if incomplete hydrogenation is to be avoided. This has been particularly emphasized in co-pending applications of Hanford and Schreiber, Serial Nos. 226,730 and 226,731, filed August 25, 1938, in which it is disclosed that solutions containing a mixture of hydroxy-aldehydes and ketones cannot be hydrogenated in the presence of formaldehyde, unless excessive amounts of catalysts are employed.

I have found, however, that by treating mixtures containing formaldehyde with alcohols such as methanol or ethanol in the presence of an acid catalyst, the corresponding acetals are produced in excellent yields. These acetals may be readily separated thereafter from the reaction mixture by the usual methods of extraction or distillation. This method thus provides a practical means for isolating or removing formaldehyde from mixtures containing the same. The formaldehyde-free solutions may then be hydrogenated in the usual way. If desired, the free formaldehyde may be readily obtained by hydrolyzing the acetal.

The process of this invention is applicable to any mixture in which formaldehyde is present as such or in a form which is readily converted to formaldehyde. Although practically any mono- or polyhydric alcohol may be used in the practice of this invention, it is preferred to employ those having a low molecular weight such, for example, as methanol, ethanol, propanol-1, propanol-2, butanol-1, ethylene and propylene glycols, etc., because with formaldehyde they give acetals which are readily distillable.

Acidic compounds in general may be used as catalysts in the formation of the acetals. Among such materials are hydrochloric and sulfuric acids, camphor sulfonic acid, p-toluene sulfonic acid, benzene sulfonic acid, magnesium sulfate, stannic chloride, ferric chloride, etc. The preferred catalysts, however, are sulfuric acid, the aryl sulfonic acids, and hydrochloric acid. The proportions of catalyst utilized may vary over a considerable range but, generally, there is no advantage in using more than 5 to 10% by weight, based on the alcohol. I have found, however, that about 1–5%, based upon the alcohol used, is generally sufficient.

*Example 1.*—Three hundred grams of paraformaldehyde were suspended in 300 grams of methanol and then dissolved by warming to 60–80° C. with a trace of sodium hydroxide. At this point 25 grams of powdered calcium oxide and 0.2 gram of glycol aldehyde were added and the solution brought to reflux. The initial temperature of the refluxing solution was 86–87° C. However, after 20 minutes, during which time the temperature dropped to about 80° C., a vigorous reaction set in and it was necessary to cool the container from time to time to prevent the reaction from becoming too violent. When the temperature of the refluxing solution had fallen to 70° C., which required approximately 10 minutes more, the solution was cooled in an ice bath and diluted with 600 cc. of methanol. Analysis of an aliquot of this solution demonstrated that approximately 90% of the formaldehyde had been condensed to a mixture of hydroxy aldehydes and ketones. In order to remove the unreacted formaldehyde so that the mixture of hydroxy aldehydes and ketones could be hydrogenated, this sample was treated with 50 grams concentrated sulfuric acid dissolved in 100 cc. of methanol. This is just slightly more than is necessary to neutralize the calcium oxide used as catalyst. The precipitated calcium sulfate was then removed by filtration and the filtrate diluted to about 2 liters with more methanol and allowed to stand at room temperature for several hours. This solution was then evaporated under a vacuum of about 30 mm. to approximately 400 cc. This treatment removed practically all of the free formaldehyde as its dimethyl acetal and, after bringing the residue in the flask to neutrality by treating with the necessary amount of barium hydroxide and filtering, the resulting filtrate was readily hydrogenated to a mixture of polyhydroxy alcohols.

It is to be understood that the above example is merely illustrative and that the invention broadly comprises removing formaldehyde from mixtures in which formaldehyde is present as such, or in the form of substances capable of liberating formaldehyde under the reacting conditions, by treatment with an alcohol, preferably a low-boiling alcohol, in an amount which is at least that theoretically required to react with substantially all of the formaldehyde present. The amount of alcohol may, however, be varied over wide limits, since that amount which is in excess of the chemical equivalent of the formaldehyde may be removed, as by distillation.

The time required for the reaction varies with the temperature, but in general the temperature at which the mixture is reacted should be sufficiently high to distill off the water formed in the course of the reaction. Generally, however, it is preferred to employ temperatures in the range of 20° to 150° C. The temperature, time, and nature and amount of catalyst are interdependent factors which vary with the nature of the reactants involved in the reaction.

If desired, the reaction may be carried out, in the presence of inert organic solvent, e. g., benzene, toluene, high boiling gasolines, etc., to facilitate the removal of the water of reaction.

The reaction may be carried out at atmospheric, subatmospheric, or super-atmospheric pressures. It is generally preferred to operate, however, at atmospheric pressure for reasons of economy and ease of operation.

It is understood that this invention is applicable to formaldehyde, polymers of formaldehyde, or to any derivative of formaldehyde capable of liberating formaldehyde under the reacting conditions. The term "formaldehyde substance" is used in the claim to refer to any of these substances.

Various changes may be made in the details of operation and preferred embodiments without departing from this invention or sacrificing the advantages thereof.

I claim:

A process of removing formaldehyde from hydroxyaldehydes and ketones which comprises acidifying the formaldehyde-containing hydroxyaldehydes and ketones, admixing excess methanol therewith, maintaining the mixture at an acetalizing temperature between 20° C. and 150° C. until substantially all the formaldehyde has been reacted, and submitting the mixture to evaporation at reduced atmospheric pressure, whereby the formaldehyde is substantially completely removed from the hydroxyaldehydes and ketones without affecting the latter substances.

CARL S. MARVEL.